Figures 1, 2:
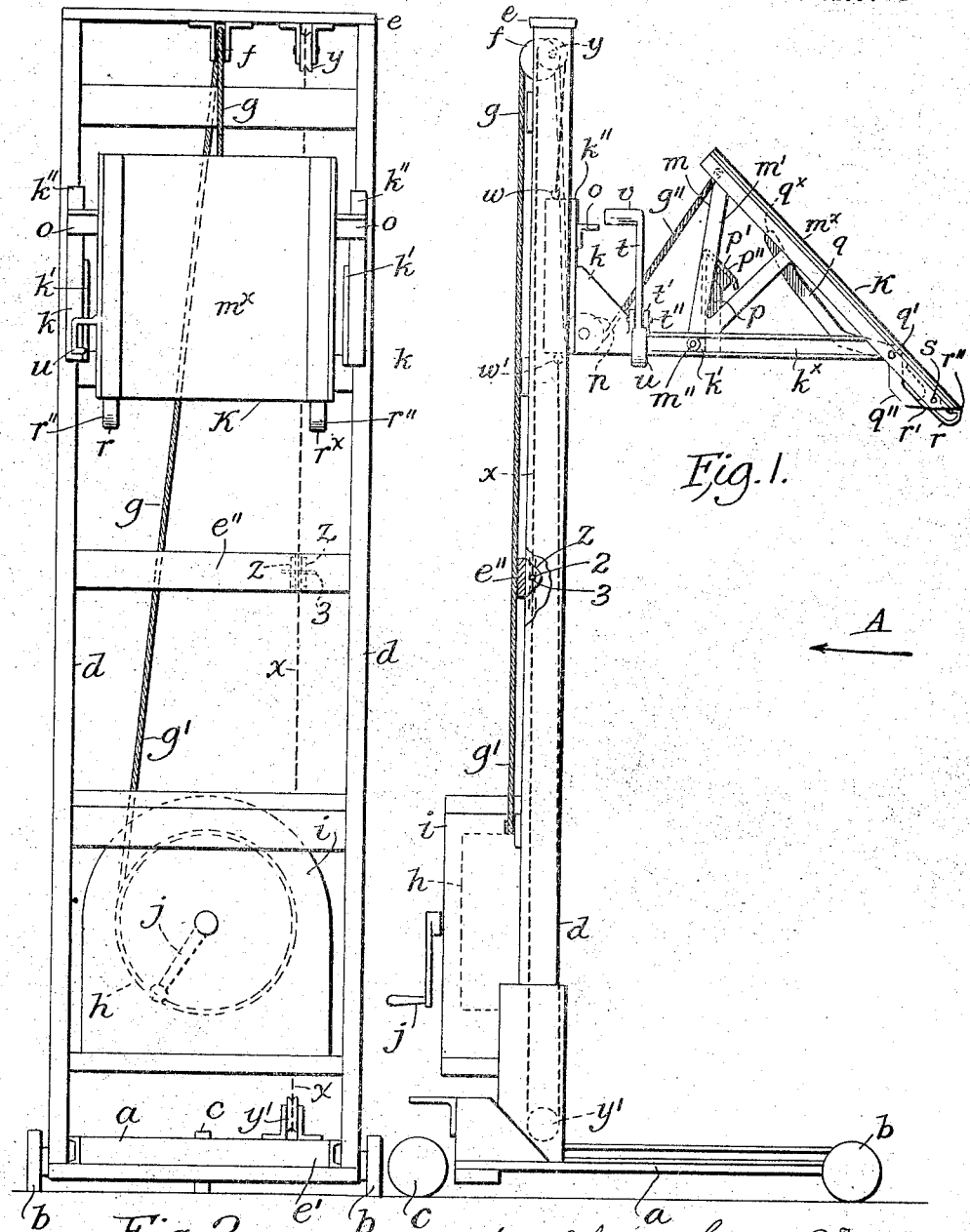

Feb. 2, 1926.

H. S. GERMOND, JR

PORTABLE ELEVATOR

Filed May 23, 1924

1,571,627

2 Sheets-Sheet 1

Henry Shelden Germond Jr. Inventor

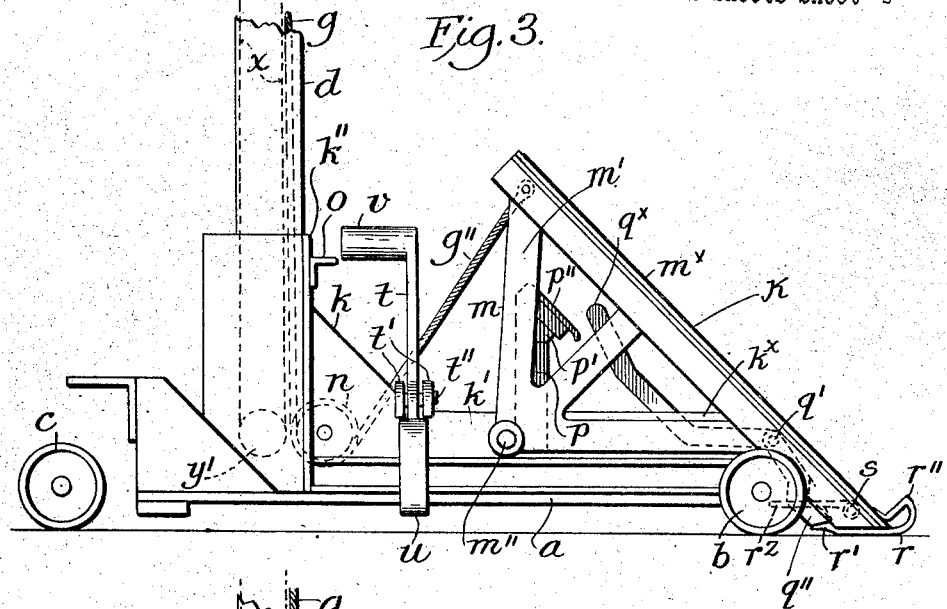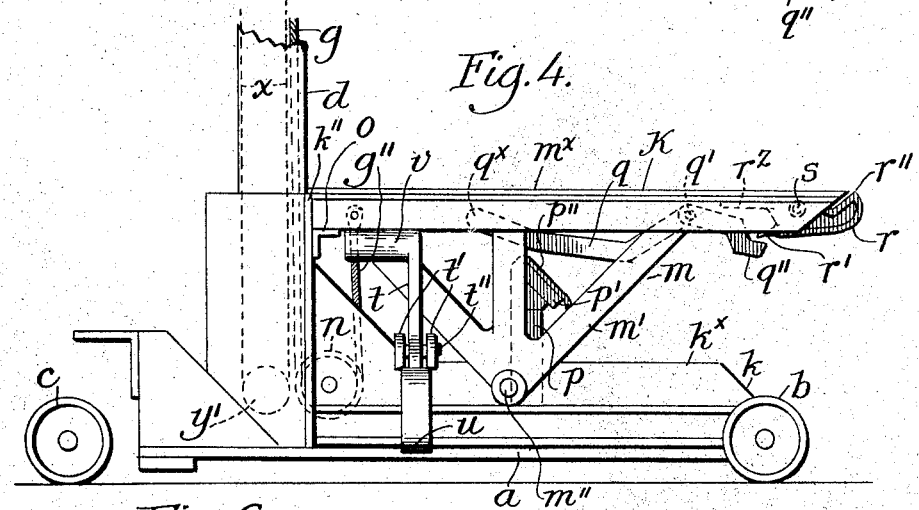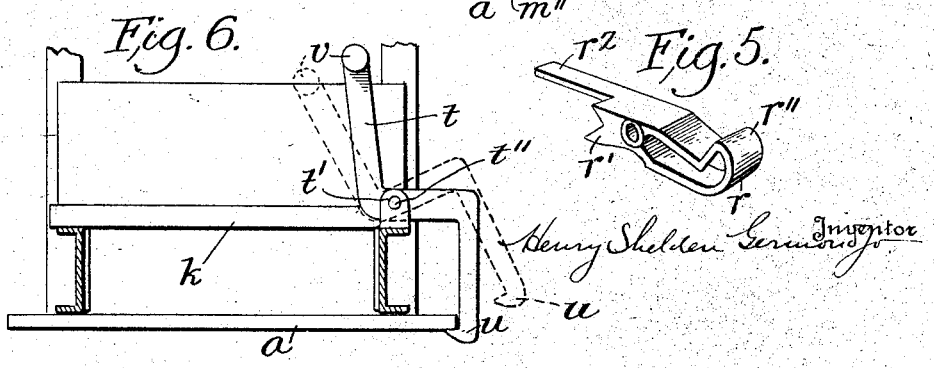

Patented Feb. 2, 1926.

1,571,627

UNITED STATES PATENT OFFICE.

HENRY SHELDEN GERMOND, JR., OF BAYONNE, NEW JERSEY.

PORTABLE ELEVATOR.

Application filed May 23, 1924. Serial No. 715,330.

*To all whom it may concern:*

Be it known that I, HENRY SHELDEN GERMOND, Jr., a citizen of the United States of America, residing at Bayonne, in the county of Hudson and State of New Jersey, have invented certain new and useful Improvements in Portable Elevators, of which the following is a specification, reference being had to the accompanying drawings.

This invention relates to improvements in tiering machines (otherwise known as portable elevators) and particularly to improvements in the load-carrying platform or carriage arranged to travel up and down in the frame of such a machine and to transport the goods from one level to another. With elevators of this type, as heretofore made, the carriage is a rigid structure onto that part of which that projects horizontally from the machine-frame, the packages or containers (e. g., casks, barrels, boxes, cartons, crates) have to be lifted in loading the platform; and, in unloading the platform, the packaged goods have to be raised and then removed therefrom. When the platform is elevated, the placing of the goods on and their removal from the horizontally-projecting part of the elevator-carriage are maneuvers difficult of performance and fraught with danger to the handler of the packages. An object of this invention is provide a carriage upon which the goods may be safely, readily and easily loaded and from which they may be removed without danger and with speed and facility.

In the drawings illustrating the principle of this invention and the best mode now known to me of applying that principle, Fig. 1 is a side elevation of a tiering machine in which this invention is embodied; Fig. 2 is an elevation looking in the direction of the arrow A of Fig. 1; Fig. 3 is a side elevation of the lower part of the elevator, the load-carrying platform being shown in tilted position for receiving packages; Fig. 4 is a view similar to Fig. 3 but shows the load-carrying platform in position ready to travel and transport the load; Fig. 5 is a detail which shows, in perspective, one of the load-retaining latches or dogs; and Fig. 6 is a detail that illustrates the mechanism for detachably locking the elevator-carriage to the elevator-truck.

Referring to the drawings, the portable elevator or tiering machine comprises a truck $a$, which rests, at one end, upon a pair of wheels $b$ and, at its other end, upon a caster (or steering) wheel $c$, to which the pull-handle or tongue (not shown) is attached. From each side of the truck $a$, there rises a standard or upright $d$; and the upper ends of this pair of uprights $d$ are joined by a top crosspiece $e$. From the latter, there hangs a pulley-block over the sheave $f$ of which there is rove a cable $g$, one end $g'$ of which is wound around the drum $h$ of a windlass mechanism, which is shown conventionally at $i$ and which may be operated manually by means of the hand-crank $j$. The parts hereinbefore described are common to elevators of the type to which this improvement is applied; and they are illustrated merely diagrammatically in the drawings.

The frame or carriage $k$ of the load-carrying platform K includes, in its construction, a pair of side-frames $k'$, which are suitably connected and braced to give proper rigidity and strength to the carriage. Each side-frame $k'$ comprises an upright $k''$, from which there projects a horizontally-disposed beam $k^x$ that is rigidly fastened thereto. These beams $k^x$ support a platform-table $m$ that comprises a pair of side-pieces $m'$ pivoted at $m''$ so as to oscillate or rock upon the horizontal beams $k^x$ of the carriage $k$. The floor $m^x$ of the table $m$ is mounted on the top of these side-pieces $m'$ and receives the packages (casks, barrels, boxes, crates and the like) that are to be arranged in tiers or rows one upon another. The other end $g''$ of the cable $g$ is passed under a pulley $n$ that is rotatably mounted on the carriage $k$. This cable-end $g''$ is fastened to the rocking or tiltable table $m$; and, when a pull is exerted upon the cable $g$, the carriage $k$ being held by mechanism hereinafter described, the rocking table $m$ will be swung, on its pivots $m''$, until it attains a horizontal position (Fig. 4), wherein the rear end of its table portion will rest upon the transverse stop-bar $o$ carried by the uprights $k''$ of the frame $k$ of the carriage. Were the workman now to cease to exert a pull on the cable $g$, the rocking-table $m$ would tilt away from the stop-bar $o$, due to the preponderance or overweight of the front part of the table $m$, and, during this tilting of the table $m$, the workman will control the unwinding of the cable $g$ from off the windlass-drum $h$. If it be supposed that the tiltable table $m$ is loaded with packages, it is obvious that, when the table $m$ has assumed the inclined position illustrated in Fig. 1, the packages (casks, boxes and the like) that are loaded on the floor $m^x$ of the table $m$ may be handled with far greater safety and speed and with far less expenditure of strength or power than would be the case, were they to be removed from a table lying in the horizontal position illustrated in Fig. 4, as does the load-carrying part of the platform or carriage of tiering-machines as heretofore constructed. Similarly, when goods are to be loaded onto the table $m$, the latter is permitted to assume an inclined position (Fig. 3); and it has been proven by experiment that the work of positioning the containers on the floor $m^x$ of the table $m$ is far less exhausting, difficult and dangerous when the goods-receiving member of the structure is inclined, during loading, than when that member lies in the horizontal position in which it is always (i. e., permanently) maintained in old structures of this general type or class, namely, old tiering machines.

One of the side-frames $k'$ of the carriage $k$ is formed with a pair of ears $t'$ through which is passed a pivot-pin $t''$ that serves as a fulcrum for a locking-lever $t$, the lower end of which is formed with a hook-shaped toe $u$ and the upper end of which carries an offset or arm $v$. The material of the locking-lever $t$ is so disposed that the dog $u$ tends to swing inwardly towards the side-frame $k'$, the weight of the lower part of the lever $t$ being preponderant over the upper portion thereof. The lever $t$ is so mounted that, when the platform K moves into its lowermost position, the hooklike toe $u$ engages the truck-base $a$ automatically and so locks the platform K thereto in that position. As the workman pays out the cable $g$, the table $m$ tilts into the position illustrated in Fig. 3. When the load has been placed upon (or taken off from) the table $m$, the workman turns the windlass-drum $h$ and winds up thereon the cable $g$. The platform K is now held against upward movement by the interlock of the dog $u$ with the truck-base $a$; and, as the cable $g$ is wound upon the windlass-drum $h$, the table $m$ is swung from its tilted position (Fig. 3) to its horizontal position (Fig. 4). Just as the table $m$ moves into the latter position and before its rear portion strikes the stop-bar $o$, that part of the table $m$ contacts with the lug $v$ that lies in its path and thereby swings the lever $t$ on its pivot-pin $t''$ so that the dog $u$ is disengaged from its interlock with the truck-base $a$, whereupon the continued pull upon the cable $g$ due to the winding up thereof on the windlass-drum $h$ causes the platform K to ascend.

To the rear part of the carriage $k$ there are fastened the ends $w$, $w'$, of a chain $x$ that is passed over and under the pulleys $v$, $v'$, respectively. The upper pulley $v$ is hung from the top crosspiece $e$ (Fig. 2), while the lower pulley $y'$ is mounted on the lowermost crosspiece $e'$. To an intermediate crosspiece $e''$, there is fastened a pair of guide-plates $z$, $z$, between which the chain $x$ travels and which are formed with holes 2 through which may be passed a lock-pin 3. When the platform K, with its table $m$ in a horizontal position, has been raised to the desired height, and it is wished to tilt the table $m$, the turning of the windlass-drum $h$ is stopped and the lock-pin 3 is passed through the holes 2 in the guide-plates $z$ and through that link of the chain $x$ that is then therebetween. The workman now pays off enough of the cable $g$ to permit the table $m$ to take an inclined position (Fig. 1), which it does due to the preponderance of its front portion. When the platform K is to be lowered, the workman winds up the cable $g$ on the windlass drum $h$, until the table $m$ has resumed its horizontal position, whereupon the lock-pin 3 is manually withdrawn from the link of the chain $x$. The platform K may now be moved vertically with its table $m$ in a horizontal position.

Rising from the horizontal portion of the carriage-frame $k$, there is a post $p$ (Figs. 1, 3 and 4) formed with a head $p'$ which has a forwardly-inclined surface $p''$. Pivoted at $q'$ to one of the side-frames $m'$ of the tiltable table $m$ of the platform K, there is a latch-controlling lever $q$, the catch-actuating end $q''$ of which is arranged to engage the heel $r'$ of a load-retaining latch $r$ formed with an upwardly-turned nose or toe $r''$. The latch $r$ is mounted on one end of a transverse shaft $s$, to the other end of which there is also fastened another load-retaining latch $r^x$ (Fig. 2) formed with a lip or toe $r''$ entirely similar to the toe $r''$ of the latch or dog $r$. These dogs or catches $r$, $r^x$, serve, when thrown into active position (that illustrated in Fig. 3), to retain the goods in place on the floor $m^x$ of the swinging table $m$, when the same is permitted to assume the inclined position shown in Fig. 3. In the latter figure, the table $m$ is in position to be loaded; and the toes $r''$ of the dogs $r$, $r^x$, project into load-retaining position above the floor $m^x$ of the table $m$. After the table $m$ has been loaded, a pull is exerted (as hereinbefore described) upon the cable $g$, whereby the table $m$ is swung to the rear; and, as the table $m$ is thrown from its inclined position (Fig. 3) to its horizontal position (Fig. 4), the rear or butt end $q^x$ of the latch-controlling lever $q$ rides up over the inclined face $p''$ of the post-head $p'$, whereby the lever $q$ is made to take the position shown in Fig. 4; that is, its butt-end $q^x$ is thrown upwardly towards the floor $m^x$ of the table $m$ and its opposite end $q''$ is moved out of engagement with the heel $r'$ of the load-holding catch $r$. This disengagement of the lever $q$ and the latch $r$ permits the nose-ends $r''$ of the dogs $r$, $r^x$, to drop just below the level of the floor $m^x$. This drop is limited by the striking of the tailpiece or finger $r^z$ against the underside of the floor $m^x$ (Fig. 4). When the table $m^x$ is brought into horizontal position, its rear end strikes against and is intercepted by the transverse stop-bar $o$ (Fig. 4) carried by the platform-frame $k$, upon which the table-end now comes to rest. As the table-end is about to contact with the stop-bar $o$, it strikes against the handle-end $v$ of the locking-lever $t$ and throws the dog-shaped end $u$ of the latter out of interlocking engagement with the truck-base $a$. The platform K is now free to be raised; and, the pull upon the cable $g$ being still further exerted, the carriage $k$ and the table $m$ thereby supported ascend. When the desired height (or tier) has been reached, the workman ceases to turn the windlass-drum $h$ and the platform K is arrested. The lock-pin 3 is passed through the holes 2 of the guide-plates $z$ and through that link of the chain $x$ that lies between them, whereby the carriage $k$ is now held in its raised position. The workman allows the windlass-drum $h$ to reverse and pay out the cable $g$ as the table $m$ rocks forwardly into dumping position (Fig. 1). In this position, the packaged goods slide down off the floor $m^x$ of the table $m$, at least partially; and such containers as remain on the floor $m^x$ are left in such a position thereon that they can be removed without great difficulty or exertion and with speed and ease.

In accordance with the patent statutes, I have shown and described the preferred form of this invention; but, nevertheless, I desire it to be distinctly understood that I fully realize that changes may be made in the structure herein disclosed and that I intend to include within the scope of the claims that follow hereinafter all modifications of the preferred form of this invention that do not depart substantially from the spirit thereof. For example, the machine may be power-operated; an example of such a machine is disclosed by William E. Boehck in United States Patent No. 1342982, granted June 8, 1920.

I claim:

1. A structure of the class described, including a load-carrying platform comprising a carriage arranged to travel up and down, a cable-controlled load-receiving table mounted on the carriage free to be thrown from and to travel-position to and from load-receiving position and load-discharging position, a load-retaining device for holding the load on the table and mechanism for controlling the position of the load-retaining device; and mechanism by which the carriage may be locked against up-and-down travel during said change of position of the table.

2. A structure of the class described, including a load-carrying platform comprising a carriage arranged to travel up and down, a cable-controlled load-receiving table mounted on the carriage free to be thrown from and to travel-position to and from load-receiving position and load-discharging position, a load-retaining device for holding the load on the table and automatically-operated mechanism for controlling the position of the load-retaining device; and mechanism by which the carriage may be locked against up-and-down travel during said change of position of the table.

Signed at Jersey City, in the county of Hudson and State of New Jersey, this twentieth day of May, 1924.

HENRY SHELDEN GERMOND, Jr.